United States Patent [19] [11] 4,380,142
Wattron et al. [45] Apr. 19, 1983

[54] AGRICULTURAL MACHINE FOR THE TEDDING OR CONDITIONING OF FODDER

[75] Inventors: Albert Wattron, Schwenheim; Michel Quirin, Allenwiller, both of France

[73] Assignee: Belrecolt S.A., Marmoutier, France

[21] Appl. No.: 215,854

[22] Filed: Dec. 12, 1980

[30] Foreign Application Priority Data

Dec. 20, 1979 [FR] France ............... 79 31888

[51] Int. Cl.[3] ........................................... A01D 49/00
[52] U.S. Cl. ................................................... 56/370
[58] Field of Search .............. 56/370, 376, 377, 192, 56/DIG. 1

[56] References Cited

U.S. PATENT DOCUMENTS

| 3,699,755 | 10/1972 | Hauser | 56/DIG. 1 |
| 4,023,335 | 5/1977 | van der Lely | 56/370 |
| 4,094,132 | 6/1978 | Decoene et al. | 56/192 |
| 4,117,653 | 10/1978 | Tarver, Jr. | 56/192 |
| 4,128,987 | 12/1978 | Zweegers | 56/370 |
| 4,187,664 | 2/1980 | Meek et al. | 56/192 |
| 4,203,277 | 5/1980 | Kaetzel | 56/370 |
| 4,269,019 | 5/1981 | Strobel | 56/370 |

FOREIGN PATENT DOCUMENTS

| 2421101 | 11/1975 | Fed. Rep. of Germany ... 56/DIG. 1 |
| 2730211 | 2/1978 | Fed. Rep. of Germany ... 56/DIG. 1 |

Primary Examiner—Jay N. Eskovitz
Attorney, Agent, or Firm—Ernest F. Marmorek

[57] ABSTRACT

An agricultural machine for the tedding or conditioning of fodder comprises a pair of drums (1,2) rotatable about shafts (12,13) which are slightly inclined in the forwards direction of travel (A) of the machine. The drums (1,2) are interconnected by a chassis (3) which is connected to a coupling member (4) by a connecting beam (5). The coupling member (4) has attachment points (6,7,8) for coupling the machine to a tractor. Each drum (1,2) carries at its lower portion a flexible, deformable skirt (17,18) for grasping and transporting the fodder. The skirts are associated with tedding or conditioning means which may comprise ribs (20) on the upper surfaces of the skirts (17,18) or other means (not shown). FIG. 1.

4 Claims, 19 Drawing Figures

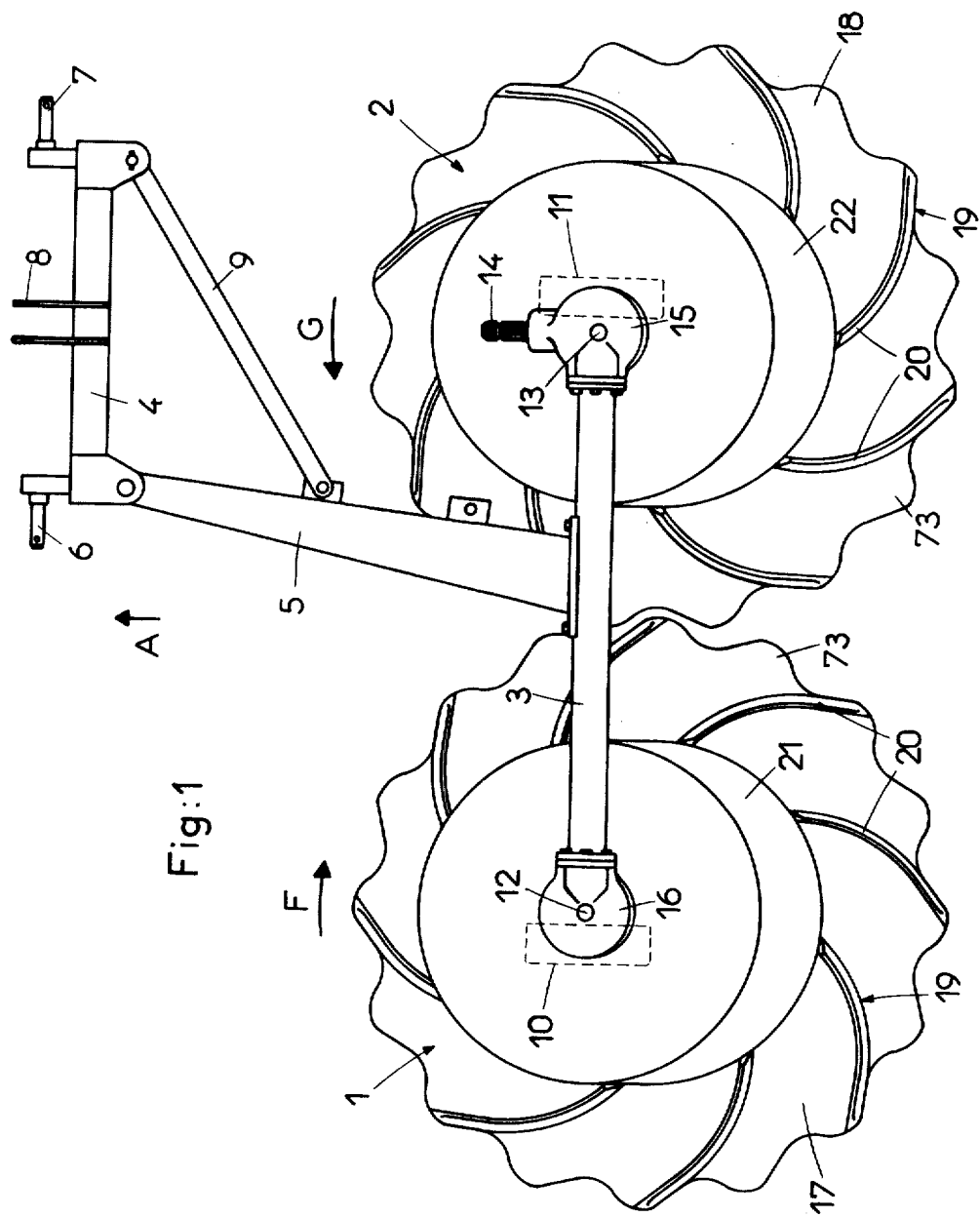
Fig:1

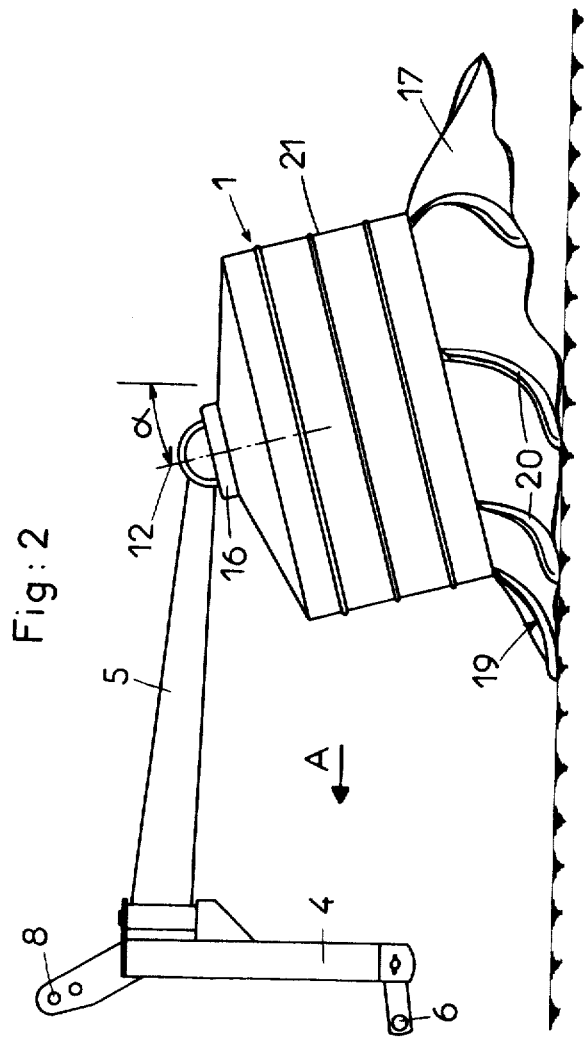

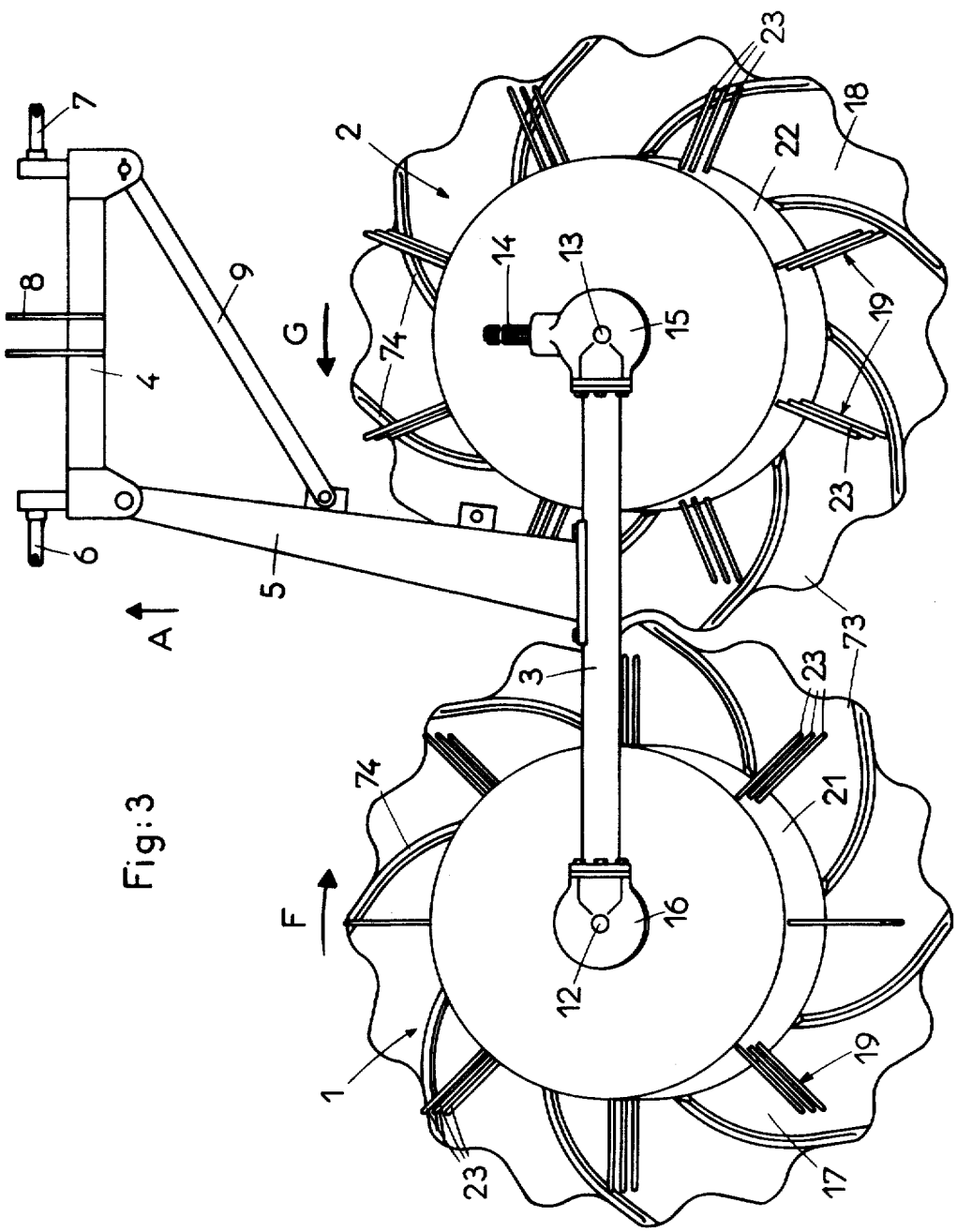
Fig:3

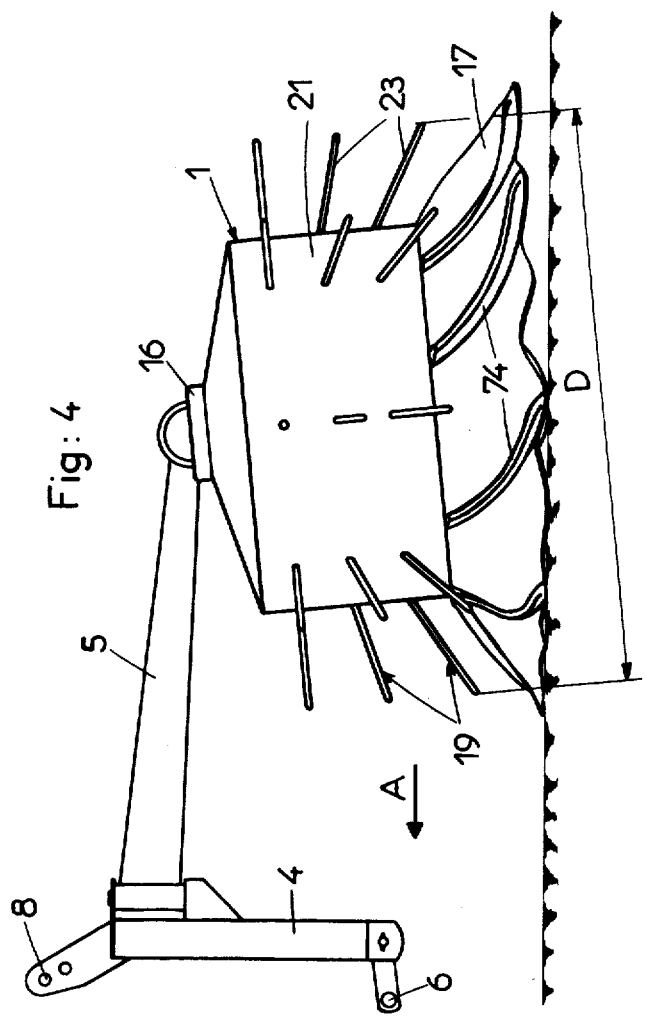
Fig: 4

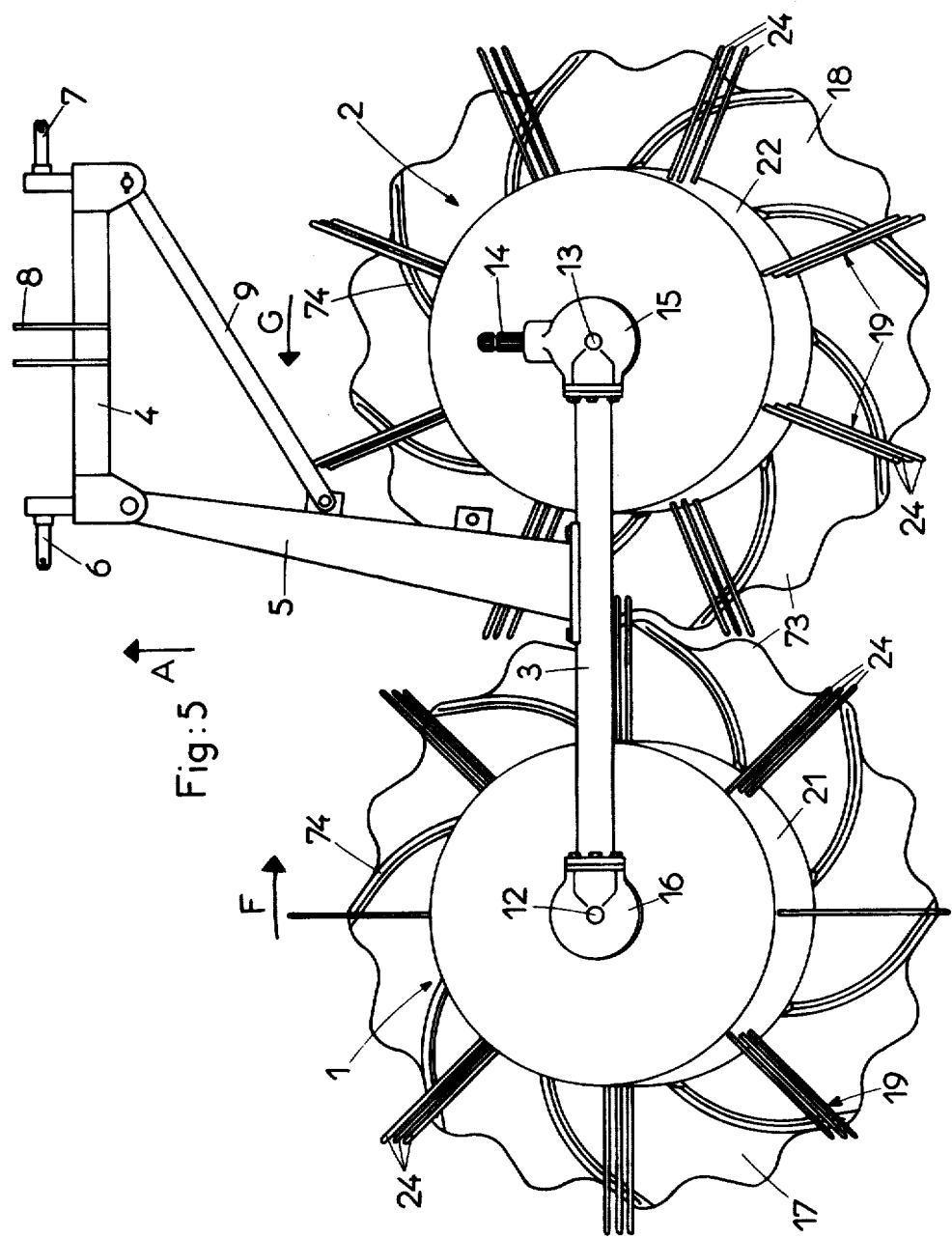

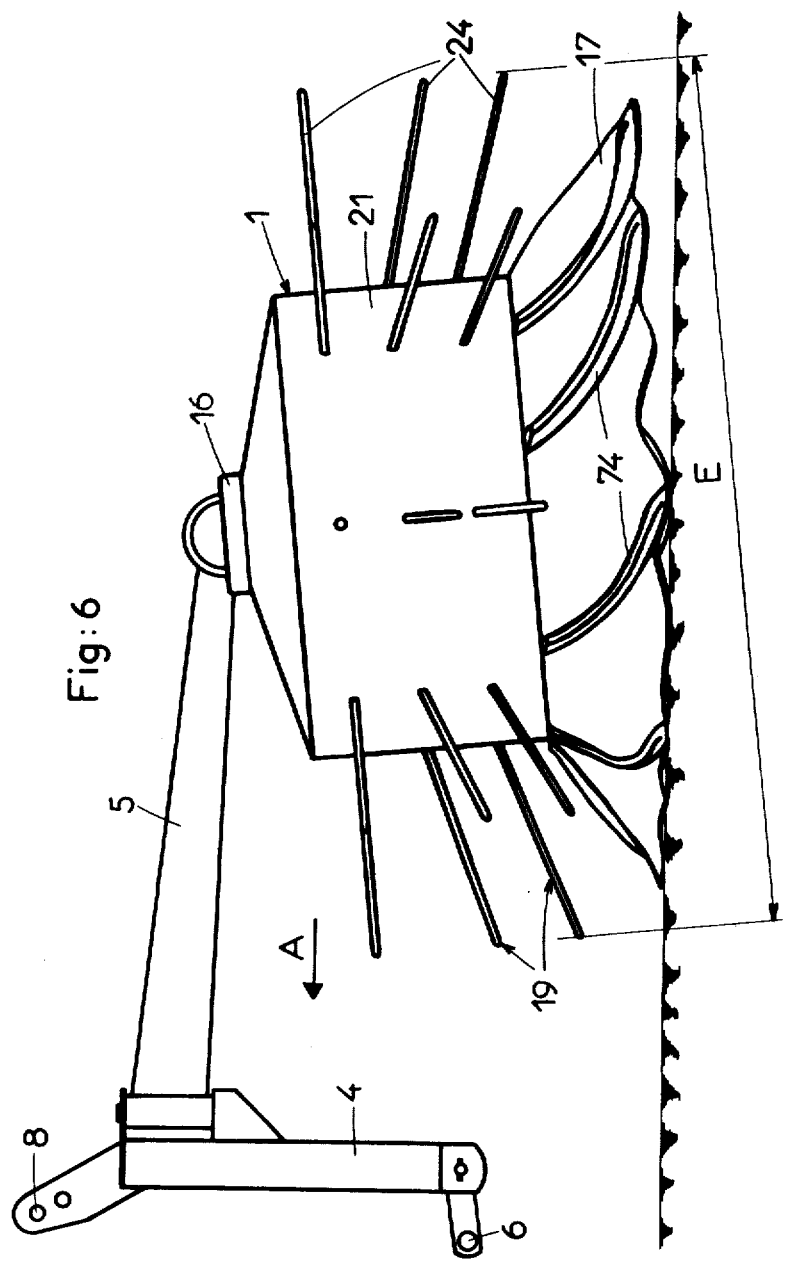

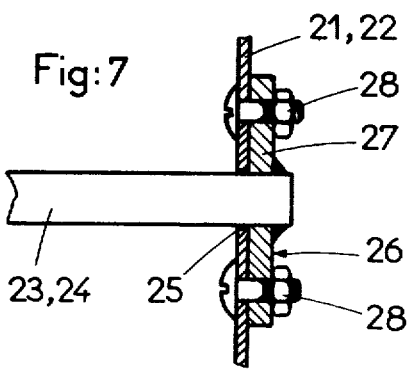
Fig: 7
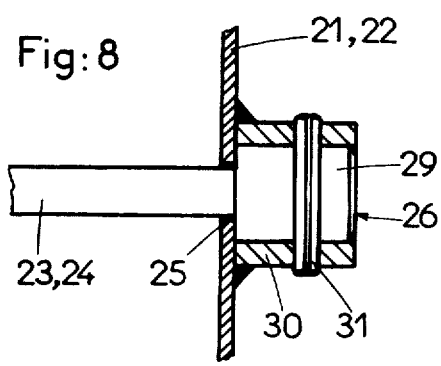
Fig: 8
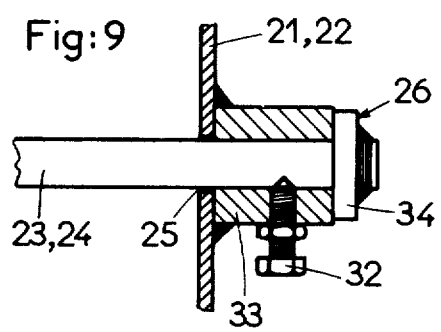
Fig: 9

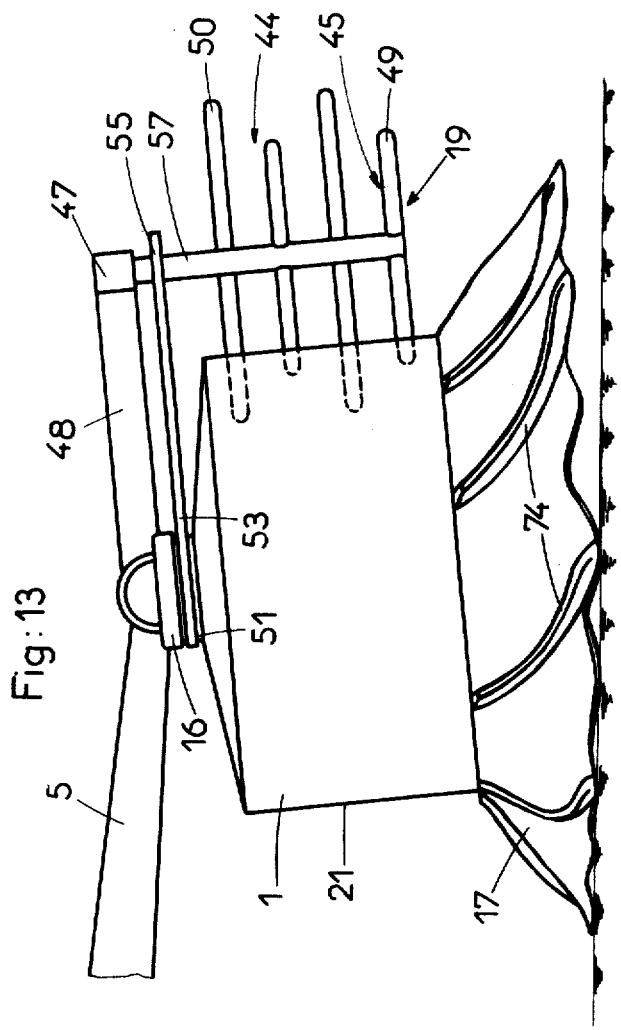

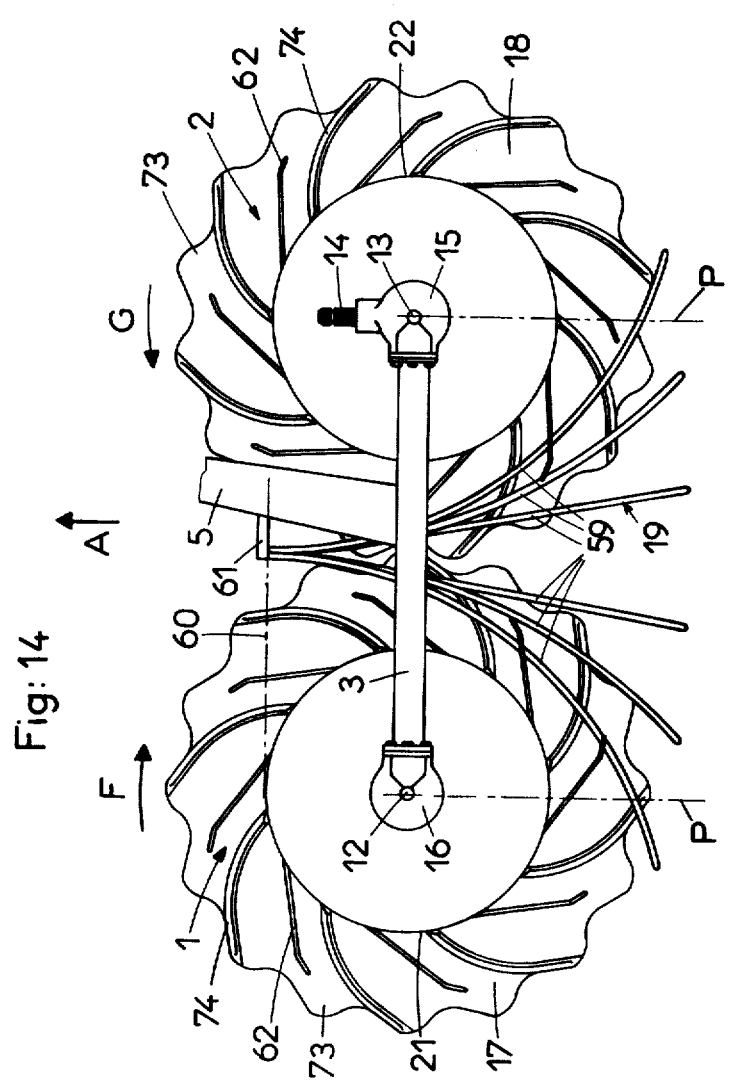
Fig: 14

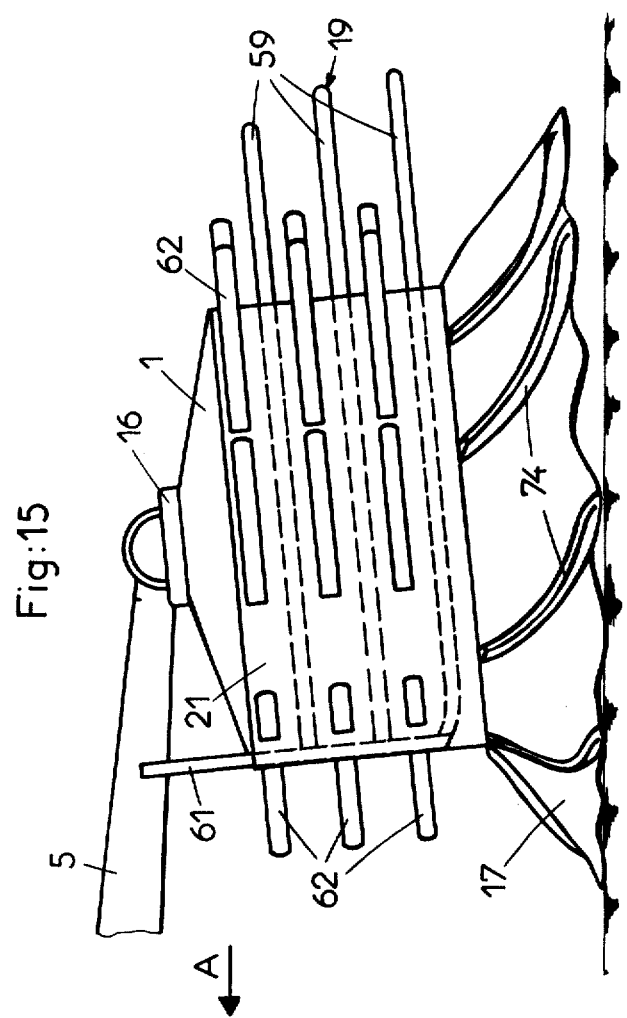

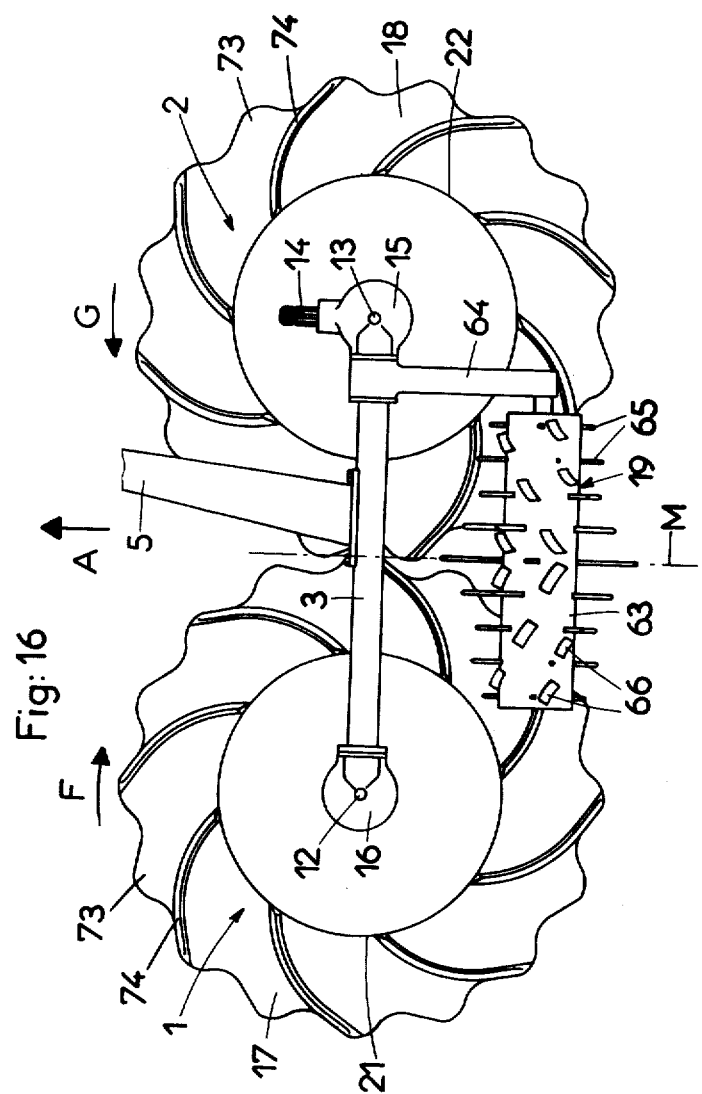

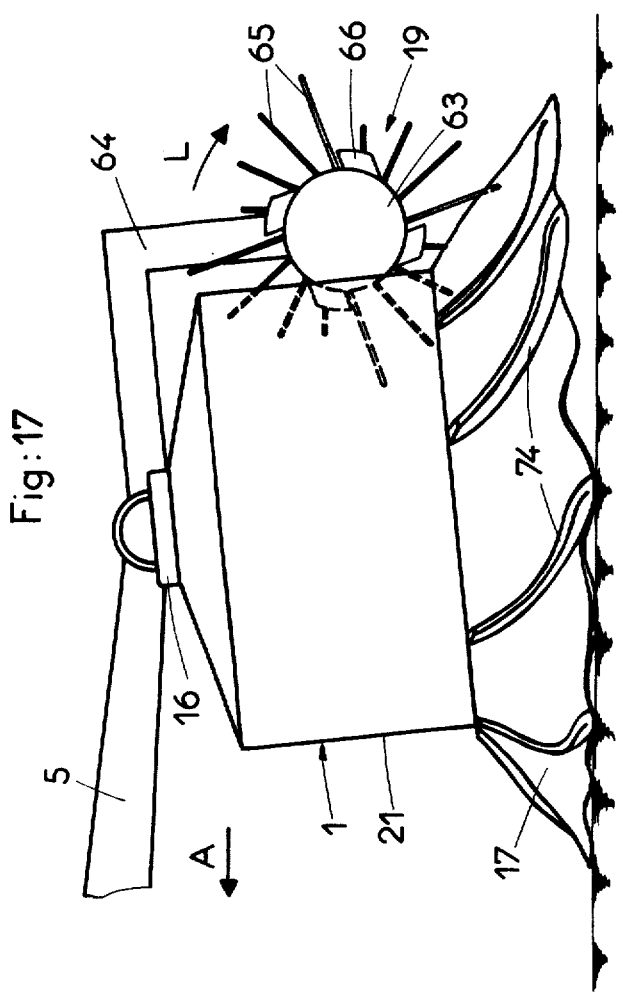

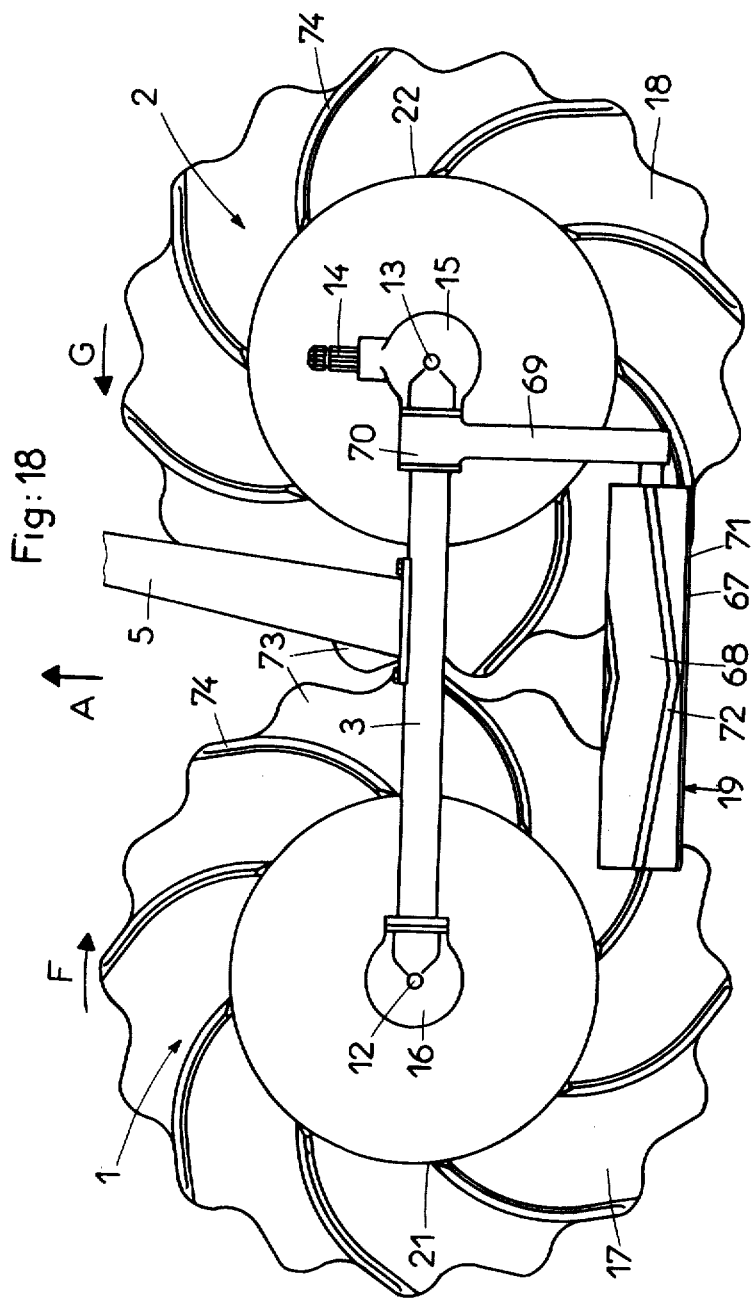

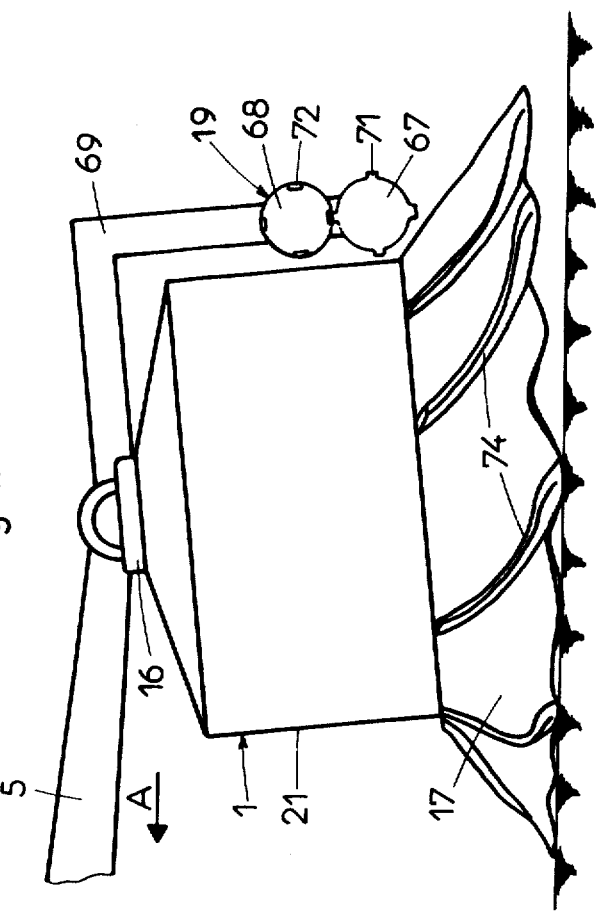

AGRICULTURAL MACHINE FOR THE TEDDING OR CONDITIONING OF FODDER

The present invention relates to a haymaking machine comprising at least one drum which is rotated about a slightly forwardly inclined shaft and carries at its lower portion a flexible, deformable skirt for grasping and transporting the fodder.

BACKGROUND OF THE INVENTION

A machine of this type makes it possible to carry out windrowing in a very effective manner. Thus, such a skirt plunges below the fodder or cut herbage to be displaced, whilst adapting well to ground level variations and transports the fodder on its upper surface, which does not drag on the ground. As a result, the fodder is not soiled by the ground which may lead to rejection of the fodder by cattle. In addition, the flexible, deformable skirt does not damage the cut fodder and yound plant shoots. Furthermore, owing to the absence of any metal forks which displace the fodder whilst scraping on the ground, it is possible to eliminate the danger constituted by broken forks for balers, ensilaging machines and self-loading trailers which are used for gathering up the fodder.

However, this machine is not really suitable for haytedding or conditioning of fodder. For these operations when the fodder is still generally green, it has to be treated in a much more vigorous manner and is preferably dispersed over a considerable width behind the machine.

SUMMARY OF THE INVENTION

The present invention aims to provide a haymaking machine with the aforementioned advantages and in which fodder can be tedded or conditioned.

According to the invention, there is provided a haymaking machine having at least one drum rotated about a shaft which is slightly forwardly inclined, the drum or drums carrying in its lower portion a flexible, deformable skirt for grasping and transporting the fodder, wherein said skirt(s) is/are associated with tedding or conditioning means.

The tedding or conditioning means may comprise elements such as ribs located on the upper surface of the skirt(s). These elements grasp the fodder lifted up by the skirt(s), entrain it and spread it behind the machine, whilst turning it over.

The means associated with the drum skirt(s) for tedding or conditioning can also be entraining or impelling means fixed, for example, to the wall of the drum(s). These impelling means extend at least partly radially with respect to the drum(s). When working, the impelling means, which rotate with the drum(s), spread the fodder taken up by the skirt(s) behind the machine.

In the case where the machine has two or more juxtaposed drums rotating in convergence, the conditioning of the fodder can be improved by bringing about the engagement of impelling means of two adjacent drums.

The tedding or conditioning means can also be constituted by impelling means fixed to a support located within the drum(s), whilst being offset with respect to the rotation shaft(s) of the latter. These impelling means are operated in such a way that they extend to the maximum outside the drum(s) in the lateral part in contact with the fodder when working and on the rear part of the drum(s). They can consequently be very close to the skirt(s) without coming into contact with the ground in the front part of the drum(s).

The fodder tedding or conditioning means can also be spreaders positioned behind the drum(s). These spreaders are constituted by two rotors which are rotated and which spread behind the machine the fodder taken up by the drum skirt(s).

The tedding or conditioning means can also be formed by guide rods extending in mould-board form above the skirt(s). These rods turn over the fodder gathered up by the skirt(s) in much the same way as a plough.

The tedding or conditioning means can also be in the form of one or more substantially horizontal rotors positioned behind the drum(s). The rotor or rotors are provided with teeth and blades which cooperate for conditioning and spreading behind the machine the fodder gathered up by the skirt(s). These rotors can be replaced by conditioning rollers which bring about the bursting of the stems or blades in order to speed up the drying thereof.

In the case where the machine has at least two drums, an important feature of the invention is that their skirts are provided with projections meshing between the drums. In this way, a partial overlapping of the trajectories described by the skirts is obtained and this ensures an integral gathering up of the fodder on the ground.

BRIEF DESCRIPTION OF THE DRAWINGS

The invention will now be further described, by way of non limitative example, with reference to the drawings, which show:

FIG. 1 a plan view of a first embodiment of a machine according to the invention.

FIG. 2 a side view of the machine according to FIG. 1.

FIG. 3 a plan view of a second embodiment of a machine according to the invention.

FIG. 4 a side view of the machine according to FIG. 3.

FIG. 5 a constructional variant of the machine of FIG. 3.

FIG. 6 a side view of this variant.

FIGS. 7, 8 and 9 on a larger scale, different ways in which the entraining or impelling means can be fixed to the drums of the machine according to the invention.

FIG. 13 a side view of the machine of FIG. 12.

FIG. 14 a plan view of a fifth embodiment of a machine according to the invention.

FIG. 15 a side view of the machine of FIG. 14.

FIG. 16 a plan view of a sixth embodiment of the machine according to the invention.

FIG. 17 a side view of the machine of FIG. 16.

FIG. 18 a plan view of a seventh embodiment of the machine according to the invention.

FIG. 19 a side view of the machine of FIG. 18.

DESCRIPTION OF THE PREFERRED EMBODIMENTS

Figure 10:
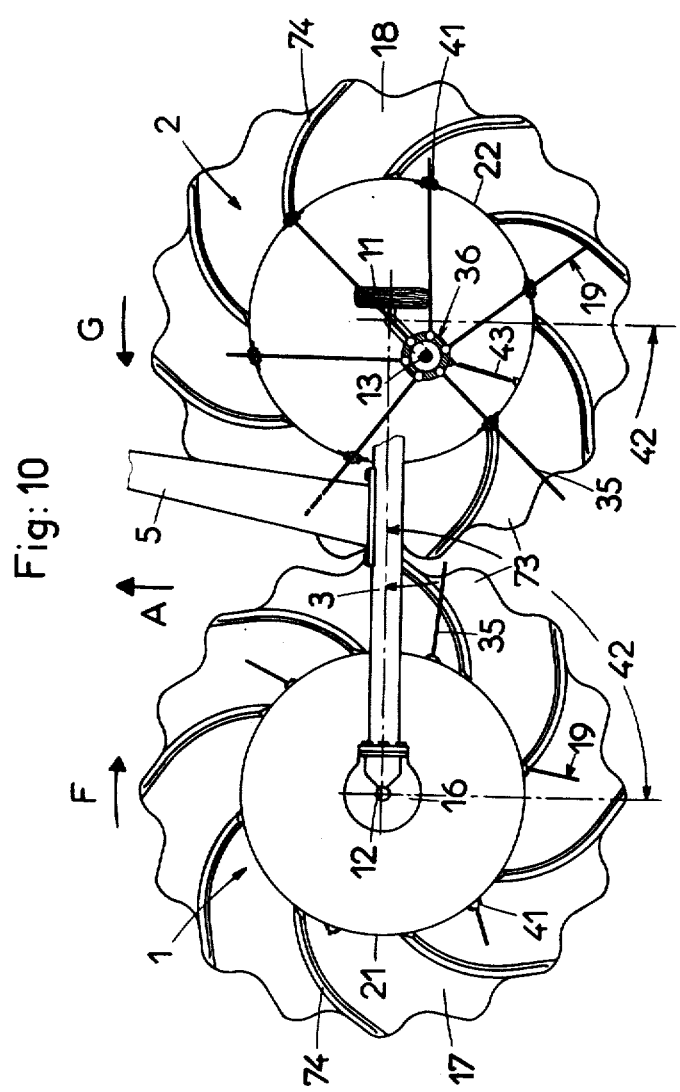
FIG. 10 a part sectional plan view of a third embodiment of a machine according to the invention.

As can be seen from the attached drawings, the machine according to the invention has two drums (1 and 2) interconnected by means of a chassis add or support (3). This chassis is itself connected to a coupling member (4) by means of a connecting beam (5). The coupling member has two lower attachment points (6 and 7) and an upper attachment point (8) for coupling to the three-point linkage device of a not shown tractor. The position of coupling member (4) relative to the connecting beam (5) can be defined by at least one cross-member (9). A small wheel (10, 11) can be provided beneath each drum (1, 2) to enable the machine to travel along the ground.

When working, drums (1, 2) are rotated in accordance with arrows (F,G) about slightly forwardly inclined shafts (12, 13), when viewed in the forward travel direction indicated by arrow (A). This driving action is obtained in per se known manner from the tractor power take-off shaft. The latter shaft is connected by means of a not shown (non-illustrated) cardan shaft to a grooved shaft end (14), which engages in a gear case (15) and drives the drum (2) by means of a bevel gear and a toothed wheel located in the case. The second drum (1) is driven by means of a transmission shaft located in chassis (3). This shaft has its end located in the gear case (15) a bevel gear which engages with the aforementioned toothed wheel and which at its other end extending into, a gear case (16) surmounting the second drum (1), has a second bevel gear which engages with a toothed wheel fixed to the drum (1).

In the lower part of each of the drums (1, 2) there is a flexible, deformable skirt (17, 18) for grasping and transporting the fodder. When working, the skirts (17, 18) plunge below the fodder to be displaced, whilst adapting well to ground level differences and transporting the fodder on their upper surface.

According to the present invention, means (19) are associated with the skirt (17, 18) for the purpose of carrying out tedding or conditioning. The means (19) are in contact with the fodder after the latter has been gathered up by the skirts (17, 18). They then entrain or guide the fodder towards the rear of the drums (1, 2) and again spread it on the ground whilst tedding and/or conditioning it.

In the embodiment of FIGS. 1 and 2, the means (19) are constituted by ribs (20) placed on the upper surface of the skirts (17, 18). The ribs (20) extend from wall (21, 22) of drums (1, 2) up to the outer periphery of the skirts (17, 18), whilst being oriented in the rotation direction (F or G) of drums (1, 2). As a result of this orientation, the ribs (20) engage well with the fodder and easily displace it rearwards. Ribs (20) are also advantageously curved in order to aid the sliding of the fodder towards the walls (21, 22) of drums (1, 2). As a result, the fodder is further disengaged from the ground, which aids it spreading behind the machine. In order to produce a slight upward projection of the fodder, the rotation shafts (12, 13) of drums (1, 2) can be forwardly inclined by an angle ($\alpha$) between 5 and 45°. This upward projection also aids the spreading of the fodder.

In the embodiment of FIGS. 3 and 4, the tedding or conditioning means (19) comprise entraining or impelling (23) fixed to the walls (21, 22) of drums (1, 2). These impelling means are formed by rigid rods extending in substantially radial planes with respect to the drums (1, 2). Their ends which are furthest from walls (21, 22) can however be slightly bent in the direction opposite to the rotation directions (F and G) of drums (1 and 2) to prevent the fodder from remaining engaged therewith. As can be more particularly gathered from FIG. 4, these impelling means (23) are arranged at a number of levels. Those located in the two lower levels are directed downwards in order to be closer to skirts (17, 18). This enables them to better take up the fodder gathered up by the skirts. In this embodiment, the diameter (D) of the trajectory described by impelling means (23) when working is smaller than the periphery of the skirts (17, 18) in order to prevent any contact with the ground, particularly in the front part of the trajectory.

The embodiment of FIGS. 5 and 6 differs from the aforementioned embodiment in that the diameter (E) of the trajectories described by the impelling means (24) is larger than the periphery of skirts (17, 18) of drums (1, 2). Between drums (1, 2) there is a partial overlapping of these trajectories. Thus, the fodder is further conditioned during passage between the two drums. Due to their significant length, the lower impelling means (24) are only slightly downwardly directed. This prevents them from coming into contact with the ground, particularly in the front part of their trajectory.

The impelling means (23,24) are advantageously fixed to the inner faces of the walls (21,22) of the drums (1,2). The impelling means (23,24) extend through holes (25) made in the the walls and have at their end located within the drums (1,2) a shoulder (26) having a larger diameter than that of the passage holes (25). Thus, in the case of disengagement or failure of the means for fixing the impelling means (23,24), the latter would still be held by the walls (21,22), thereby preventing them from being lost in the fodder.

To this end, according to the embodiment of FIG. 7, the retaining plate (27) is welded to the impelling means (23 or 24). This plate is also traversed by bolts (28) ensuring the fixing of the impelling means (23,24) to the respective walls (21,22) of the drums (1,2).

In the embodiment of FIG. 8, the impelling means (23 or 24) have a boss (29), whose diameter is greater than that of the passage hole (25). This boss is engaged in a bush (30) welded to the wall (21 or 22) of the drum (1 or 2). A pin (31) passing both through the bush (30) and the boss (29) of the impelling means (23, 24) ensures the fixing of the latter.

In FIG. 9, the impelling means (23,24) are fixed by means of a pointed end screw (32) traversing a ring (33) welded to the wall (21,22) of the respective drum (1,2). Moreover, the impelling means (23,24) have at the ends a retaining collar (34), whose diameter is greater than that of hole (25).

Figure 11:
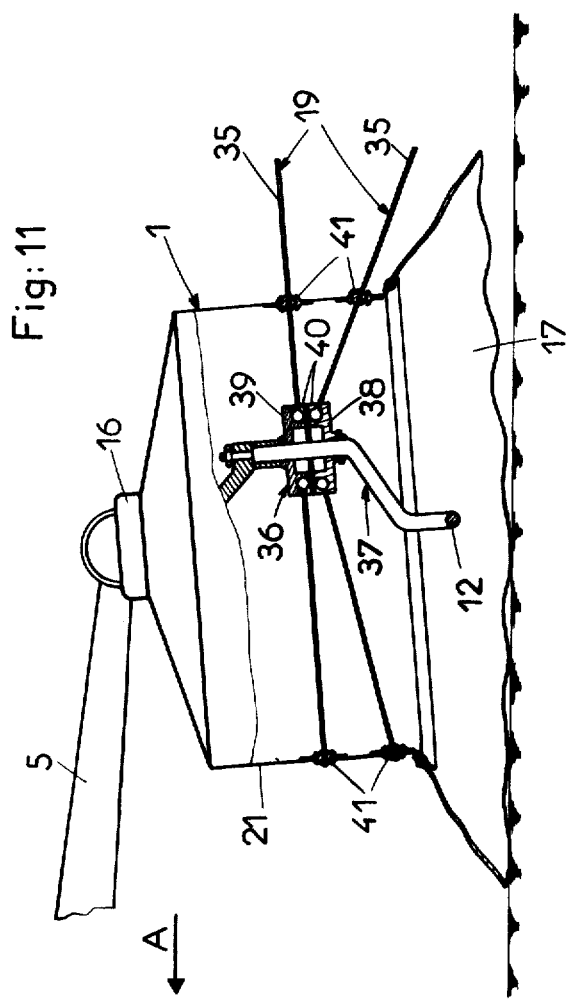
FIG. 11 a part sectional side view of the machine of FIG. 10.

In the embodiment of FIGS. 10 and 11, the means (19) associated with skirts (17, 18) for tedding or conditioning purposes are constituted by impelling means (35) articulated to supports (36) each arranged within one of the drums (1, 2) and offset with respect to the axis of rotation of the latter. Supports (36) rotate freely on and relative to the shafts (12,13). The latter form an elbow (37) at the position of said supports. Each of the supports (36) is constructed in two parts (38, 39), each of which has recesses (40) for receiving the inner ends of drive means (35). These ends are spherical so as to permit the orientation of impelling means (35) with respect to supports (36) during the rotation of drums (1, 2). The impelling means (35) pass through ball joints (41) located on walls (21, 22) of drums (1, 2). As can be gathered from FIG. 10, each support (36) is positioned in the rear quarter (42) of its drums (1, 2) which is closest to the passage of the fodder when the latter is displaced towards the rear of the machine. As a result of this positioning, impelling means (35) project to the maximum out of drums (1, 2) in the rear quarter (42). In this area, they engage well there with the fodder enabling them to ted and spread the the fodder to the rear of the machine. However, impelling means (35) are largely positioned within the drums (1, 2) over the front part of the latter. Therefore, the lower impelling means (35) can be very close to the skirts (17, 18) without there being any risk of their touching the ground in the front part of their trajectory. When working, each support (36) is rotated by means of a spring (43) connecting it to the corresponding drum (1, 2).

Figure 12:
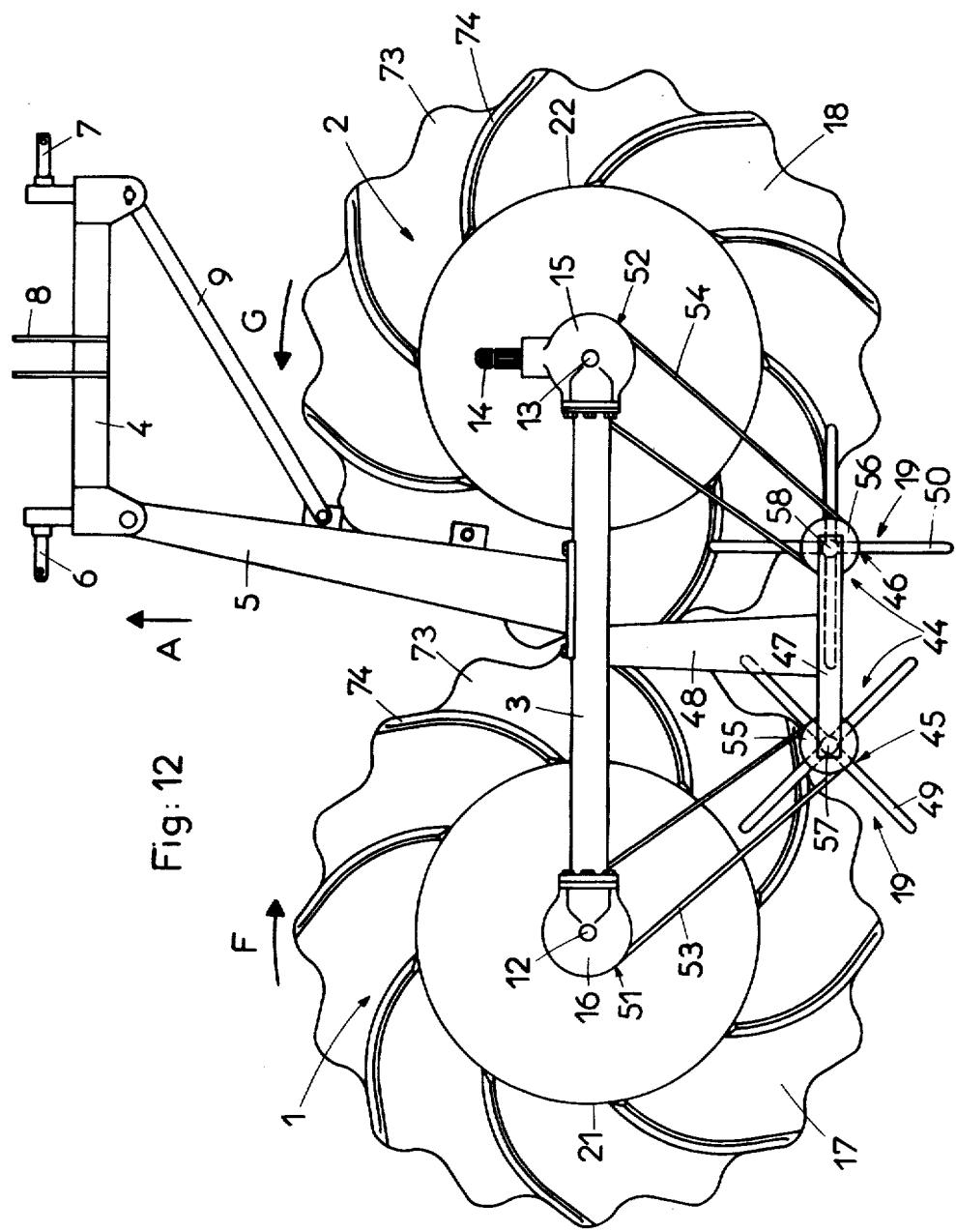
FIG. 12 plan view of a fourth embodiment of a machine according to the invention.

The fodder tedding or conditioning means can also be constituted by spreaders (44) positioned behind the drums (1, 2). As shown in FIGS. 12 and 13, these spreaders are formed by two rotors (45,46) interconnected by means of a beam (47), which is itself connected to the support chassis (3) of drums (1, 2) by means of a beam (48). Rotors (45, 46) are provided with radial teeth (49, 50), whose trajectories partly overlap. In order to prevent any collision between the teeth (49, 50), they are advantageously displaced in a heightwise manner with respect to the ground. When working, rotors (45, 46) are rotated so as to turn in convergence at the front, viewed in the forward travel direction (A), as from drums (1, 2). To this end, each of the drums has a pulley (51, 52) over which passes a belt (53, 54). Each belt (53, 54) also passes over a pulley (55, 56) provided on rotors (45, 46). The rotation spindles (57, 58) of rotors (45, 46) are substantially parallel to the shafts (12, 13) of drims (1, 2). However, the spindles (57,58) can also be slightly forwardly or laterally inclined in order to obtain a projection of the fodder in a certain direction.

When working, the rotors (45, 46) intercept the fodder transported rearwards by skirts (17, 18) of drums (1, 2). This fodder is then conditioned whilst passing between the two rotors (45, 46) which again spread it behind the machine.

In he embodiment according to FIGS. 14 and 15, guide rods (59) are provided for tedding or conditioning the fodder. These rods extend substantially from a line (60) tangential to the front part of drums (1, 2) to the rear of the latter in the form of a mould-board. At their front end, they are fixed to a support (61) connected to beam (5), connecting the chassis (3) and the coupling member (4). Rods (59) are arranged at several levels. Those of the upper level extend to the rear of drums (1, 2), preferably beyond a plane (P) parallel to the forward travel direction (A) and passing through the rotation shaft (12 or 13) of said drums. When working, the fodder gathered up by skirts (17, 18) slides along the rods (59) towards the rear of the machine. This displacement is aided by .neans of strips (62) fixed to walls (21, 22) of the drums (1, 2) which move the fodder. As the latter slides rearwards, it is turned over by rods (59) and falls onto the ground. The friction between the fodder and rods (59) brings about the bursting of the protective film of the stalks or blades forming the fodder, which speeds up the drying thereof.

In the embodiment of FIGS. 16 and 17, the tedding or conditioning means are constituted by a rotor (63) positioned behind the drums (1, 2). The rotor (63) is connected to chassis (3) by a bent arm (64) in which are housed (non-illustrated) means for rotating the rotor in the direction of arrow (L). These means can, for example, be notched belts or chains. Rotor (63) is provided with the teeth (65) which take up the fodder gathered up by skirts (17 and 18), as well as blades (66) having a ventilating action and bringing about the dispersion of the fodder behind the machine. To this end, the blades (66) positioned on the same side with respect to the median plane (M) of rotor (63) are preferably oriented towards the corresponding end of the rotor, and where the median plane of the rotor is substantially at right angles with the normally horizontally axis of the rotor. The length of teeth (65) varies as a function of the profile of the skirts (17, 18) in order to facilitate the taking up of the fodder from that skirts. Thus, teeth (65) in the middle part of rotor (63) are longer than those close to its ends. Furthermore, teeth (65) are oriented slightly in the direction opposite to the rotation direction (L) of rotor (63) to prevent them holding back the fodder. It is advantageously possible to provide a second rotor substantially parallel to rotor (63), which cooperates with the latter to improve the conditioning action.

The machine according to FIGS. 18 and 19 is provided with two conditioning rollers (67, 68) positioned behind drums (1, 2) and connected to chassis (3) by means of a bent arm (69). This arm advantageously houses drive means such as toothed wheels ensuring the rotation of the rollers from a gear case (70). When working, they are driven so as to turn in convergence at the front, viewed in the forward travel direction of the machine. The fodder from skirts (17, 18) consequently passes between the two rollers (67, 68) which bend and flatten the stalks or blades in order to accelerate the evaporation of the water. This effect is improved by means of ribs (71) on roller (67) and cavities (72) with the same profile provided on the other roller (68). After passing between the rollers (67, 68) the fodder again drops onto the ground in the form of a well ventilated layer.

According to another feature of the invention, the skirts (17, 18) of drums (1, 2) are peripherally provided with projections (73) which engage between the drums. This leads to a slight overlapping of their trajectories, ensuring an integral gathering up of the fodder. In addition, these projections (73) aid the gathering up of the fodder. Thus, when working, they to some extent separate the fodder from the ground and assist its passage onto skirts (17, 18).

In the embodiments of FIGS. 3 to 19, the upper surface of skirts (17, 18) is provided with ribs (74) extending in a direction opposite to the rotation direction (F or G) from the walls (21, 22) of the drums (1, 2). These ribs (74) assist the gathering up and displacement of the fodder.

It is obvious that numerous improvements, modifications or additions can be made to the embodiments described in non-limitative and exemplified manner hereinbefore, whilst certain components can be replaced by technical equivalents without being beyond the scope of the invention.

We claim:

1. In a machine for handling cut herbage during forward movement of the machine on the ground,
    in combination:
    a support,
    at least one drum mounted on said support for rotation about an axis which is inclined upwardly and forwardly in respect of the direction of movement of the machine,
    driving means operable for rotating said drum about said axis,
    a flexible deformable skirt mounted on the lower portion of said drum for joint rotation therewith and operative for lifting the cut herbage and moving it rearwardly, tedding means cooperating with said skirt for tedding the lifted herbage prior to its deposition on the ground, wherein said drum is hollow, and a mounting support situated within said hollow drum, and wherein said tedding means includes impelling means affixed to said mounting support.

2. A machine as defined in claim 1, wherein said mounting support is radially offset from the axis of rotation of said drum.

3. A machine as defined in claim 2, wherein said mounting support is offset from said axis in a rearward direction and in a direction toward the path in which the lifted herbage is moved by said skirt.

4. A machine as defined in claim 1, further comprising a spring extending between and interconnecting said mounting support and said drum.

* * * * *